US011522425B2

(12) United States Patent
Rubin

(10) Patent No.: US 11,522,425 B2
(45) Date of Patent: Dec. 6, 2022

(54) PLANAR HIGH TORQUE ELECTRIC MOTOR

(71) Applicant: Indiana University Research and Technology Corporation, Indianapolis, IN (US)

(72) Inventor: Matthew J. Rubin, Indianapolis, IN (US)

(73) Assignee: INDIANA UNIVERSITY RESEARCH AND TECHNOLOGY CORPORATION, Indianapolis, IN (US)

( * ) Notice: Subject to any disclaimer, the term of this patent is extended or adjusted under 35 U.S.C. 154(b) by 371 days.

(21) Appl. No.: 16/753,372

(22) PCT Filed: Oct. 25, 2018

(86) PCT No.: PCT/IB2018/058339
§ 371 (c)(1),
(2) Date: Apr. 3, 2020

(87) PCT Pub. No.: WO2019/082123
PCT Pub. Date: May 2, 2019

(65) Prior Publication Data
US 2020/0280249 A1 Sep. 3, 2020

Related U.S. Application Data

(60) Provisional application No. 62/576,981, filed on Oct. 25, 2017.

(51) Int. Cl.
*H02K 3/24* (2006.01)
*H02K 16/02* (2006.01)
*H02K 7/08* (2006.01)

(52) U.S. Cl.
CPC .............. *H02K 16/02* (2013.01); *H02K 3/24* (2013.01); *H02K 7/08* (2013.01)

(58) Field of Classification Search
CPC ............ H02K 3/24; H02K 7/003; H02K 7/08; H02K 9/19; H02K 16/02; H02K 41/065
See application file for complete search history.

(56) References Cited

U.S. PATENT DOCUMENTS

| 4,470,752 A | 9/1984 | Teruo et al. |
| 5,383,821 A * | 1/1995 | Murakami .............. F16H 1/321 475/164 |

(Continued)

FOREIGN PATENT DOCUMENTS

| CN | 1127677 A | 7/1996 |
| JP | 2005127428 A | 5/2005 |
| KR | 20070054738 A | 5/2007 |

OTHER PUBLICATIONS

International Search Report and Written Opinion issued by the ISA/KR, Korean Intellectual Property Office, dated Feb. 22, 2019, for International Application No. PCT/IB2018/058339.

*Primary Examiner* — Dang D Le
(74) *Attorney, Agent, or Firm* — Faegre Drinker Biddle & Reath LLP

(57) ABSTRACT

A motor is provided, and includes: a stator having a plurality of electromagnets and a plurality of rolling elements arranged around the electromagnets; a rotor having a plurality of rotor traction components arranged to engage the plurality of rolling elements; and a control circuit; wherein the plurality of rolling elements are arranged relative to the plurality of rotor traction components to form a gap between the plurality of rolling elements and the plurality of rotor traction components; wherein the control circuit is configured to activate the plurality of electromagnets to cause the rotor to pivot about a pivot point defined in a spherical (Continued)

bearing and change the gap such that the rotor compresses against the stator and the plurality of rolling elements and the plurality of rotor traction components translate the compression into tangential thrust and rotation of the rotor.

20 Claims, 26 Drawing Sheets

(56) References Cited

U.S. PATENT DOCUMENTS

| | | | |
|---|---|---|---|
| 7,128,469 B2* | 10/2006 | Kobayashi | F16H 49/001 |
| | | | 384/912 |
| 9,281,736 B2* | 3/2016 | Atmur | H02K 41/065 |
| 2005/0061595 A1 | 3/2005 | Maehara | |
| 2007/0063595 A1 | 3/2007 | Habibi et al. | |
| 2007/0200208 A1 | 8/2007 | Wang | |
| 2016/0341283 A1* | 11/2016 | Robuck | B64C 27/14 |

* cited by examiner

PLANAR HIGH TORQUE ELECTRIC MOTOR

CROSS-REFERENCE TO RELATED APPLICATIONS

The present application is the U.S. National Stage of International Patent Application No. PCT/IB2018/058339, filed Oct. 25, 2018, which claims priority to U.S. Provisional Patent Application No. 62/576,981, titled "PLANAR HIGH TORQUE ELECTRIC MOTOR," filed on Oct. 25, 2017, the entire disclosures of which are hereby expressly incorporated herein by reference in their entireties.

TECHNICAL FIELD

The present invention relates generally to electric motors, and more particularly to electric motors having a planar or conical rotor that contacts a complementary shaped stator during operation.

BACKGROUND

Industrial and commercial processes often require significant levels of torque to perform the required work for an application. Whether propelling vehicles in a traction application or driving conveyors in a commercial factory, high torque motors are used to produce many of the goods we consume today. Unfortunately, high torque motors, whether hydraulic, pneumatic, or electric tend to either be bulky, low duty cycle, delicate, or require frequent service to maintain operation.

Hydraulic motors, which use high pressure hydraulic fluid (up to 3000 PSI) to drive a mechanical mechanism, are high torque density motors that range from sub-horsepower to several thousand horsepower. While they are relatively inefficient due to fluid turbulence and mechanical friction produced at the high operating pressure and flow rates, the heat resulting from mechanical loss is carried away by the acting hydraulic fluid. In addition, hydraulic motors suffer from frequent hydraulic seal failure requiring frequent maintenance, and often rely on an electric motor to produce the hydraulic pressure, limiting their application in systems that do not already have easy access to hydraulic fluid.

Electric gear motors are often used in high torque applications where hydraulic fluid is unavailable or where long service life is required. Electric gear motors comprise a high speed electric motor placed in mechanical communication with a single or multi-stage gear reducer. While electric gear-motors are seen as the preferred solution for many commercial and light industrial applications, they tend to be bulky and relatively sensitive to mechanical shock, which may break teeth in a gearbox during operation.

Rolling rotor reluctance motors have been studied academically for some time; however, they remain impractical in all applications except for compact micro-motors. While theoretically promising, the technology has been unable to deliver high torque due to inconsistent torque transfer mechanisms and intrinsic vibrations resulting from the eccentrically rotating rotors Therefore, there remains a need for a compact, high torque density electric motor capable of operating in rugged environments without the use of hydraulic fluid as an intermediary. While previous attempts of high ratio electric gear motors and rolling rotor reluctance motors have shown promise, they have been unable to realize the dream of reliable high torque density electric motors. The present invention addresses these needs.

SUMMARY

As described in detail below, a motor according to the principles of the present disclosure may include a first traction assembly further comprising a first traction component operationally connected to a first magnetic component; a second traction assembly further comprising a second traction component operationally connecting to a second magnetic component; wherein at least one magnetic component further comprises a plurality of poles; a spherical bearing operationally connecting a first traction component and a second traction component; and a circuit configured to electromagnetically activate at least one pole of a first magnetic component; wherein electromagnetic activation causes the change in the gap resulting in compression of the first magnetic component and the second magnetic component about the pivot point defined by the spherical bearing, wherein compression is translated into tangential thrust via mechanical communication of the first traction component and second traction component.

According to one embodiment, the present disclosure provides a motor, comprising: a stator having a plurality of electromagnets and a first plurality of stator traction components arranged around the electromagnets; a first rotor having a first plurality of rotor traction components arranged to engage the first plurality of stator traction components; at least one of the stator or the first rotor further comprising a spherical bearing operationally connecting the stator and the first rotor; and a control circuit; wherein the first plurality of stator traction components are arranged in a planar or conical relationship and the first plurality of rotor traction components are arranged in a corresponding planar or conical relationship and disposed to form a gap between the first plurality of stator traction components and the first plurality of rotor traction components; wherein the control circuit is configured to activate the plurality of electromagnets to cause the first rotor to pivot about a pivot point defined in the spherical bearing and change the gap such that the first rotor compresses against the stator and the first plurality of stator traction components and the first plurality of rotor traction components translate the compression into tangential thrust and rotation of the first rotor; and wherein the first plurality of stator traction components includes a first number of rolling elements. In one aspect of this embodiment, the first plurality of rotor traction components includes a first number of teeth, the first number of teeth being different from the first number of rolling elements. In another aspect, each of the rolling elements includes an axle supported by and extending between a pair of spaced apart support tabs extending from a first side of the stator, and a substantially cylindrical roller mounted for rotation on the axle in response to engagement by the first plurality of rotor traction components. Yet another aspect of this embodiment further comprises an output plate having a plurality of drive teeth, wherein the first rotor further includes a plurality of drive teeth configured to mesh with the plurality of drive teeth of the output plate as the first rotor rotates, thereby causing the output plate to rotate. In still another aspect, the first plurality of stator traction components are formed on a conical surface of the stator and the first plurality of rotor traction components are formed on a conical surface of the first rotor configured to substantially correspond to the conical surface of the stator. In a variant of this aspect, an angle difference between the conical surface of the stator and the conical surface of the first rotor is between zero degrees and three degrees. In another aspect, the spherical bearing is selected from the group consisting of a simple spherical journal bearing, a solid lubricant spherical bearing, a ball-joint bearing, or a spherical rolling joint bearing. In yet another aspect, the stator further comprises a second plurality of stator traction components, the first plurality of stator traction components being arranged on a first surface of the stator and the second plurality of stator traction components being arranged on a second surface of the stator that is substantially opposite the first surface. A variant of this aspect further comprises a second rotor having a second plurality of rotor traction components arranged to engage the second plurality of stator traction components, wherein the control circuit is configured to activate the plurality of electromagnets to cause the first rotor to compress against the first plurality of stator traction components and to cause the second rotor to compress against the second plurality of stator traction components. In another aspect of this embodiment, the stator includes a cooling chamber configured to enable indirect fluid cooling of the plurality of electromagnets. In another aspect, the first rotor includes a magnetic component having at least two concentric permanent magnetic rings.

In another embodiment, the present disclosure provides a motor, comprising: a stator; a first rotor disposed adjacent the stator; a first plurality of rolling elements arranged on one of the stator or the first roller; a first plurality of teeth arranged on another of the stator or the first roller to engage the first plurality of rolling elements; a plurality of electromagnets mounted to one of the stator or the first rotor; a magnetic component mounted to another of the stator or the first rotor; at least one of the stator or the first rotor further comprising a spherical bearing operationally connecting the stator and the first rotor; and a control circuit configured to activate the plurality of electromagnets to cause the first rotor to pivot about a pivot point defined in the spherical bearing and change a gap between the first plurality of rolling elements and the first plurality of teeth such that the first rotor compresses against the stator and the first plurality of rolling elements and the first plurality of teeth translate the compression into tangential thrust and rotation of the first rotor. In one aspect of this embodiment, the first plurality of rolling elements are arranged in a planar or conical relationship and the first plurality of teeth are arranged in a corresponding planar or conical relationship and disposed to form the gap between the first plurality of rolling elements and the first plurality of teeth. In another aspect, the first plurality of teeth includes a first number of teeth and the first plurality of rolling elements includes a first number of rolling elements, the first number of teeth being different from the first number of rolling elements. In another aspect, each of the rolling elements includes an axle supported by and extending between a pair of spaced apart support tabs extending from a first side of the stator, and a substantially cylindrical roller mounted for rotation on the axle in response to engagement by the first plurality of teeth. In yet another aspect, the motor further comprises an output plate having a plurality of drive teeth, wherein the first rotor further includes a plurality of drive teeth configured to mesh with the plurality of drive teeth of the output plate as the first rotor rotates, thereby causing the output plate to rotate. In still another aspect, the first plurality of rolling elements are formed on a conical surface of the stator and the first plurality of teeth are formed on a conical surface of the first rotor configured to substantially correspond to the conical surface of the stator. In another aspect, the first plurality of rolling elements are arranged on a first surface of the stator and a second plurality of rolling elements is arranged on a second surface of the stator that is substantially opposite the first surface. A variant of this aspect further comprises a second rotor having a magnetic component and a second plurality of teeth arranged to engage the second plurality of rolling elements, wherein the control circuit is configured to activate the plurality of electromagnets to cause the first rotor to compress against the first plurality of rolling elements and to cause the second rotor to compress against the second plurality of rolling elements.

In yet another embodiment, the present disclosure provides a method of operating a motor, comprising: activating a plurality of electromagnets mounted to a stator in a sequence; wherein activating the plurality of electromagnets causes a change in a gap between a plurality of teeth arranged on a rotor adjacent the stator and a plurality of rolling elements arranged on the stator, thereby causing the rotor to compress against the stator and the plurality of rolling elements and the plurality of teeth to translate the compression into rotation of the rotor.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

BRIEF DESCRIPTION OF THE DRAWINGS

The above-mentioned and other features of this disclosure and the manner of obtaining them will become more apparent and the disclosure itself will be better understood by reference to the following description of embodiments of the present disclosure taken in conjunction with the accompanying drawings, wherein.

Figure 1:
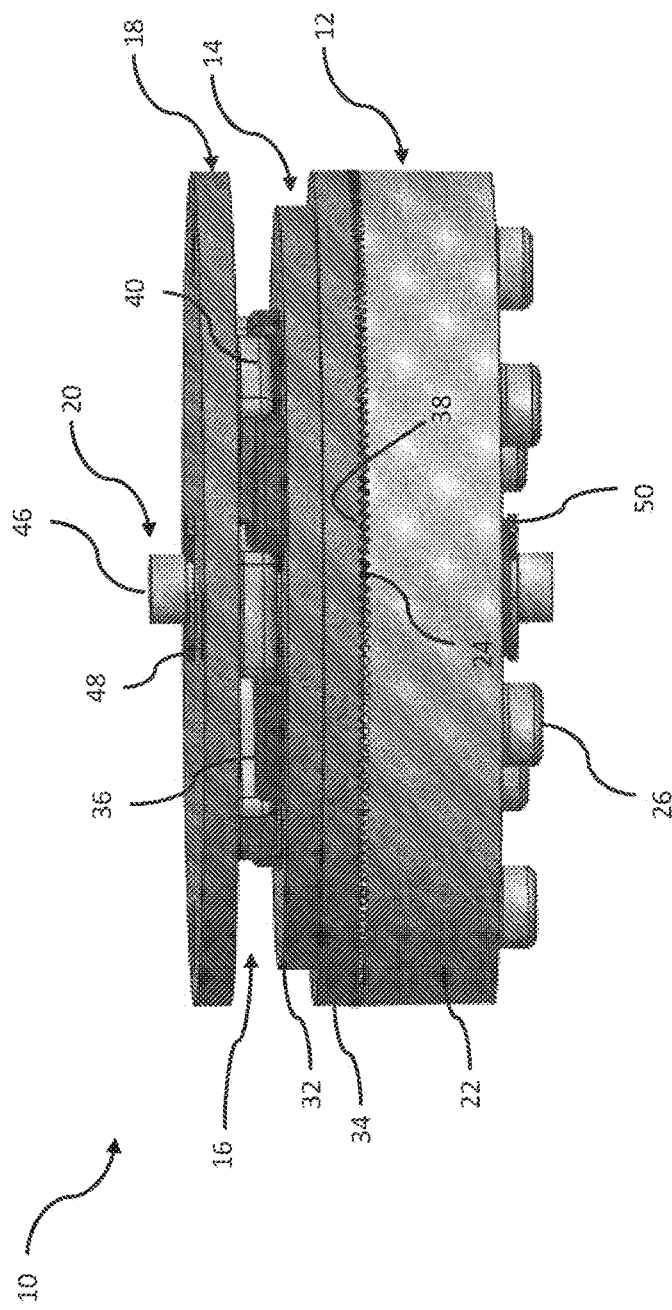
FIG. 1 is a side view of a motor according to one embodiment of the disclosure.
Figure 2:
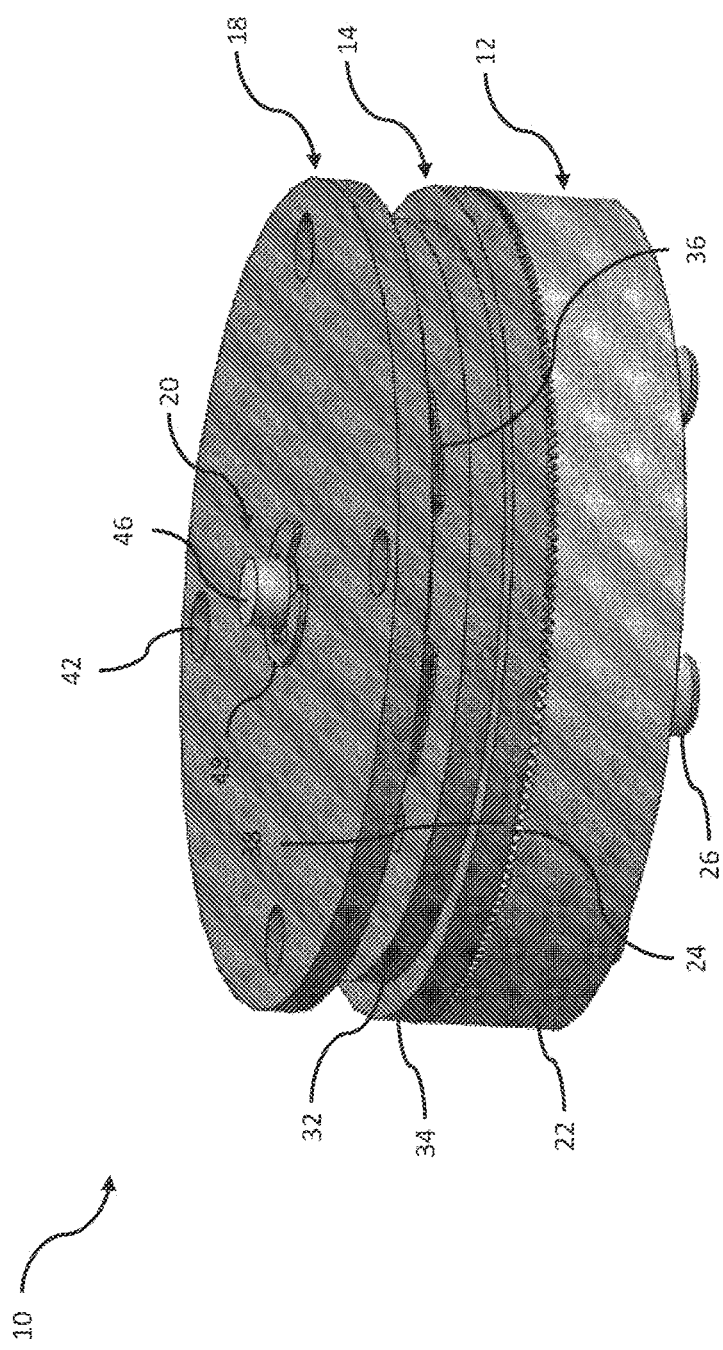
FIGS. 2-4 are perspective views of the motor of FIG. 1.
Figure 3:
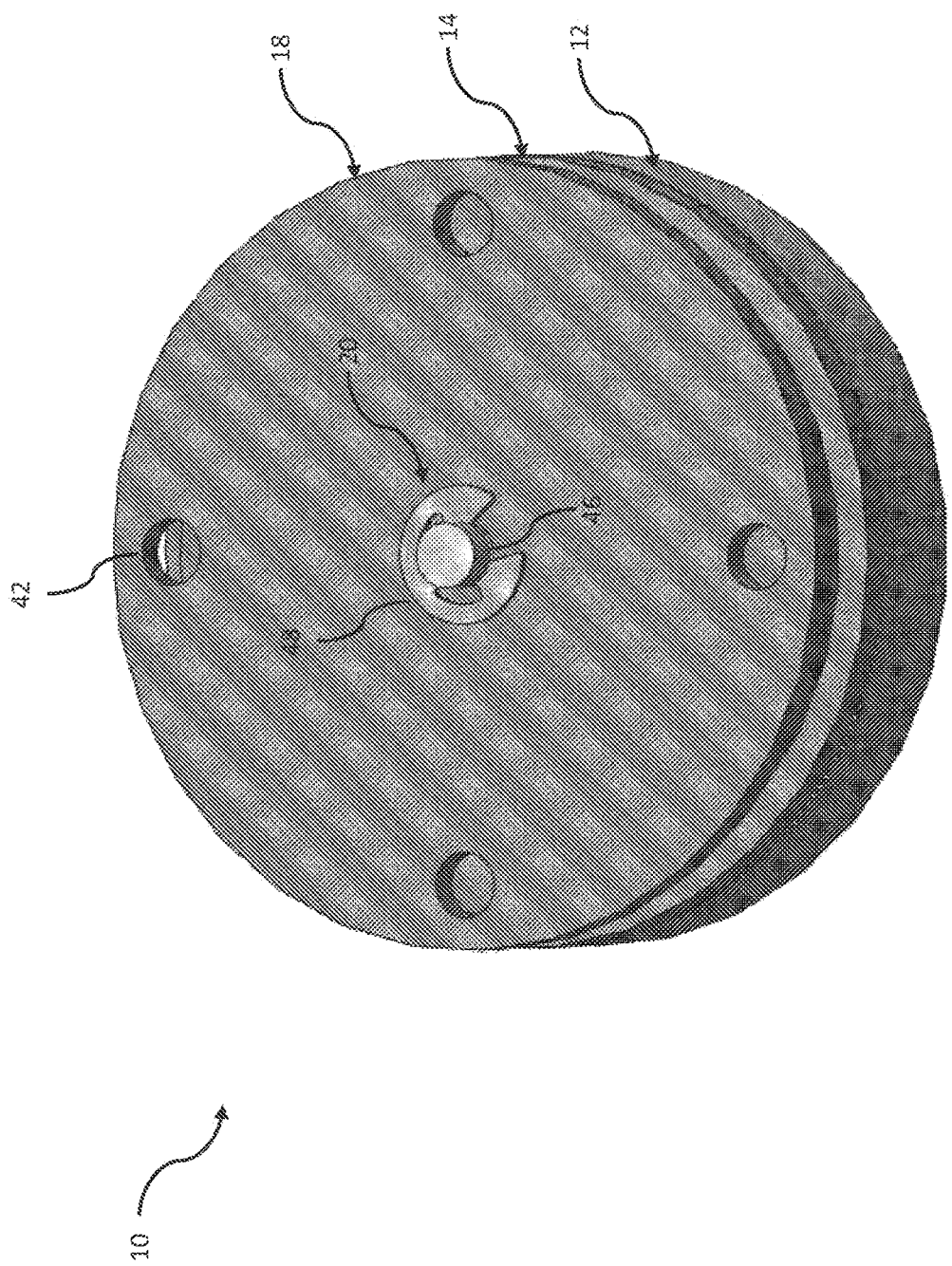

While the present disclosure is amenable to various modifications and alternative forms, specific embodiments have been shown by way of example in the drawings and are described in detail below. The present disclosure, however, is not to limit the particular embodiments described. On the contrary, the present disclosure is intended to cover all modifications, equivalents, and alternatives falling within the scope of the appended claims.

DETAILED DESCRIPTION

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

Several aspects of the structure and functionality of the present disclosure and variations thereof are further described in the pending patent application Ser. No. 15/549,659, filed on Aug. 8, 2017, entitled "High Torque Density Electric Motor and/or Generator" ("the '659 Application"), the entire contents of which being expressly incorporated herein by reference.

In certain embodiments of the present disclosure, a surface velocity of the first magnetic component is substantially the same as a surface velocity of the second magnetic component during operation of at least one portion of the first magnetic component and the second magnetic component. See the '659 Application for further description. In other embodiments, a coupling output may be operationally connected to a traction component as further described in the '659 Application. In still other embodiments, a traction component may comprise rolling element as further described in the '659 Application. In certain embodiments of the present disclosure, a magnetic component may contain a permanent magnet. Such an addition would enable attraction and repulsion of the rail, as well as no-power magnetic pre-loading of the contact point to prevent ratcheting. In other embodiments of the present disclosure, a dynamically balanced electric motor may comprise one stationary traction assembly and two rotating traction assemblies each operationally connected to the stationary traction assembly via a spherical bearing. The magnetic components referred to herein may comprise a plurality of poles as described in the '659 Application. The gap between the various rotor embodiments and stator embodiments may be defined by contact of the traction components or by contact of the magnetic components as described in '659 Application.

Figure 4:
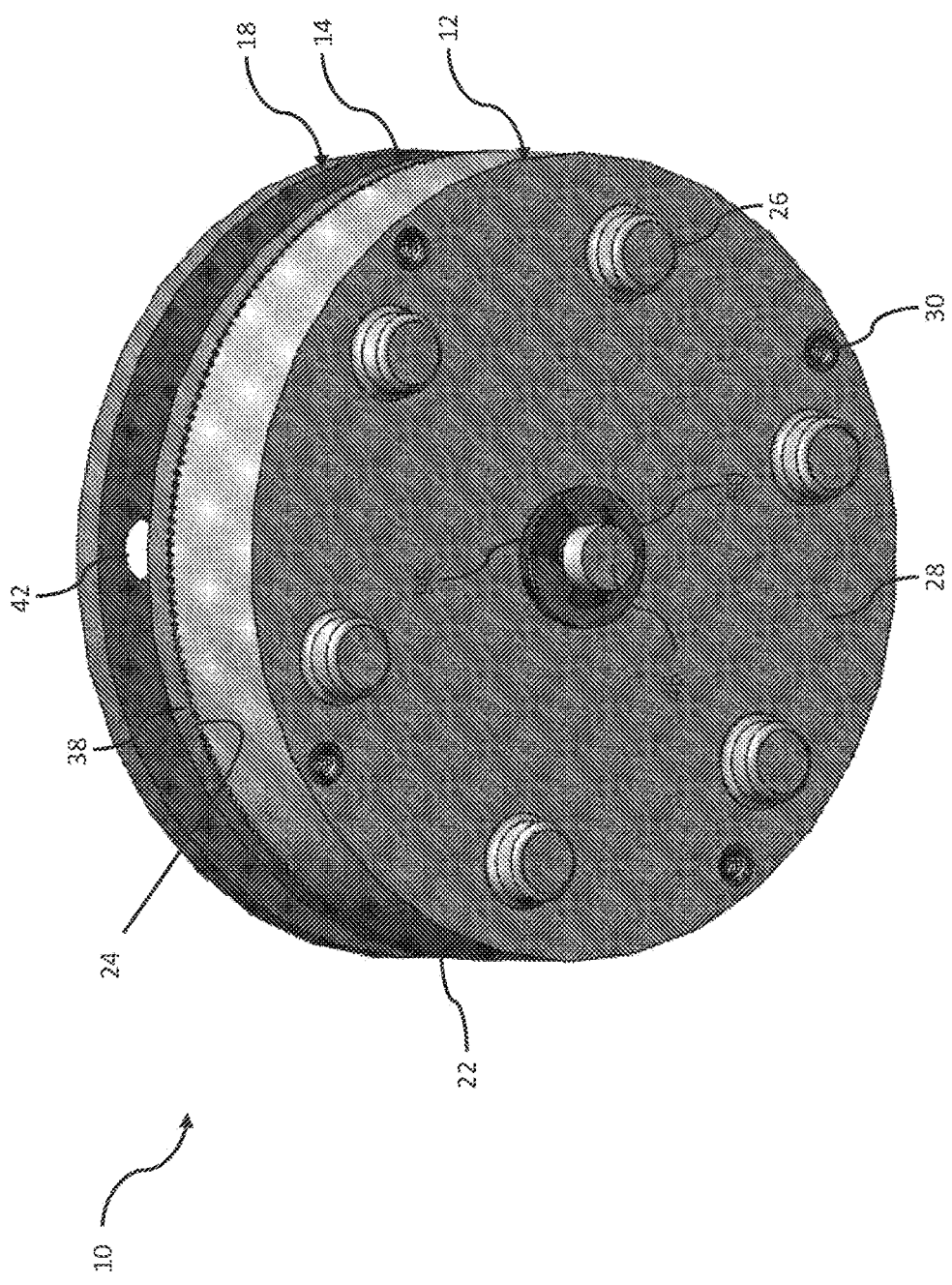
Figure 5:
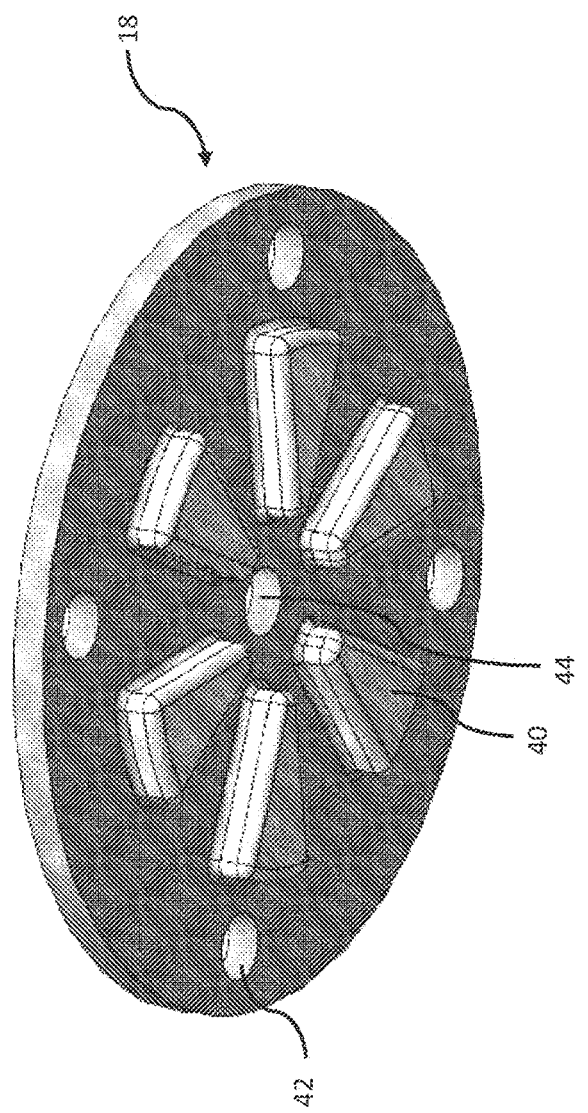
FIG. 5 is a perspective view of an output plate.
Figure 6:
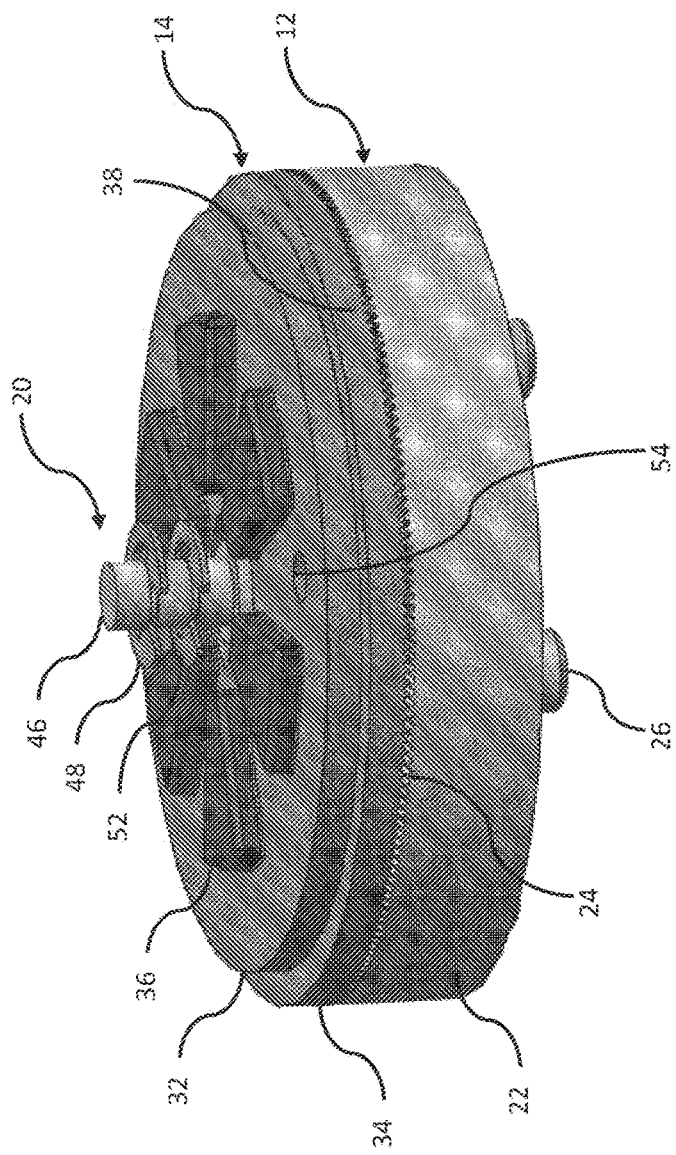
FIG. 6 is a perspective view of the motor of FIG. 1 with the output plate of FIG. 5 removed.

Referring now to FIGS. 1-4, a planar high torque motor according to one embodiment of the present disclosure is shown. Motor 10 generally includes a stator 12, a rotor 14, a shaft coupling interface 16, an output plate 18 and may also include an output shaft assembly 20. As shown, stator 12 includes a cylindrical body 22 having a plurality of gear teeth 24 disposed along its upper surface. Body 22 also includes a plurality of studs 26 projecting from its lower wall 28. As best shown in FIG. 4, lower surface of stator body 22 also includes a plurality of threaded openings 30 for attaching stator 12 to a mounting structure. Rotor 14 includes an upper support plate 32 and a lower support plate 34. Upper support plate 32 includes a plurality of drive teeth 36 and lower support plate 34 includes a plurality of gear teeth 38. Output plate 18 includes a plurality of drive teeth 40. Drive teeth 36 of upper support plate 32 and drive teeth 40 of output plate 18 mesh together as rotor 14 operates as is described herein and form shaft coupling interface 16. Output plate 18 further includes a plurality of openings 42 and a central opening 44 to receive an output shaft 46 of output shaft assembly 20. Output shaft assembly 20 further includes an upper retaining ring 48 and a lower retaining ring 50. As shown in FIG. 6, with output plate 18 removed, another retaining ring 52 is shown secured to output shaft 46 below output plate 18.

Figure 7:
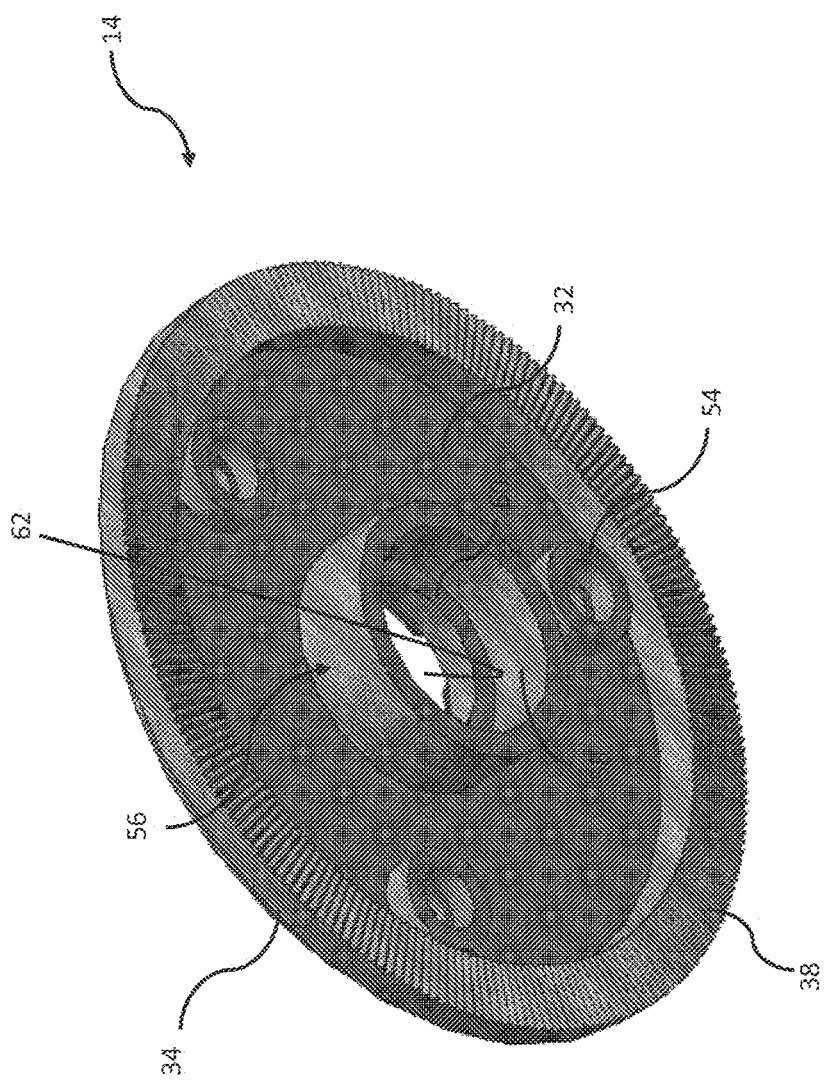
FIG. 7 is a perspective view of a component of a rotor.

Referring now to FIG. 7, rotor 14 further includes a plurality of bosses 54 extending from upper support plate 32 and a central boss 56 having a cylindrical outer wall 58 and a cylindrical inner wall 60 that defines a central opening 62 through rotor 14. As is further described herein, central boss 56 is configured to receive a spherical bearing which is part of output shaft assembly 20.

Figure 8:
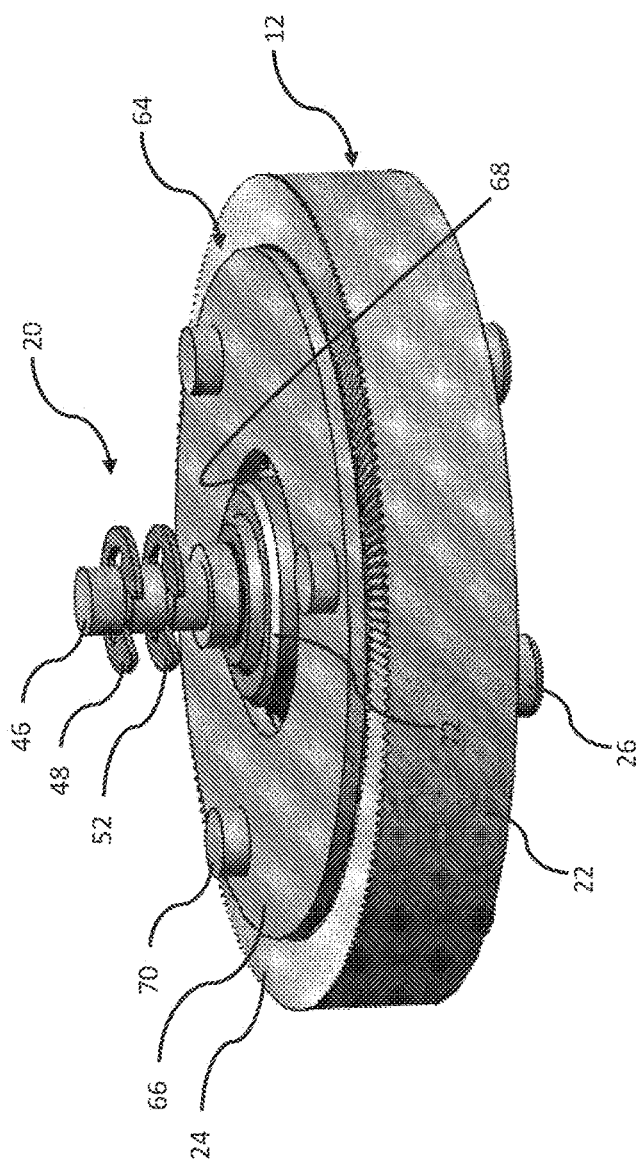
FIG. 8 is a perspective view of the motor of FIG. 1 with the output plate of FIG. 5 and the rotor component of FIG. 7 removed.

Referring now to FIG. 8, a magnetic plate 64 of rotor 14 is shown. Plate 64 is formed of magnetic materials and includes a ring 66 which defines a central opening 68 and a plurality of posts 70 extending from ring 66. Posts 70 are spaced on ring 66 to align with and be received by bosses 54 of upper support plate 32. FIG. 8 further shows spherical bearing 72 of output shaft assembly 20 which extends through central opening 68 of magnetic plate 64.

Figure 9:
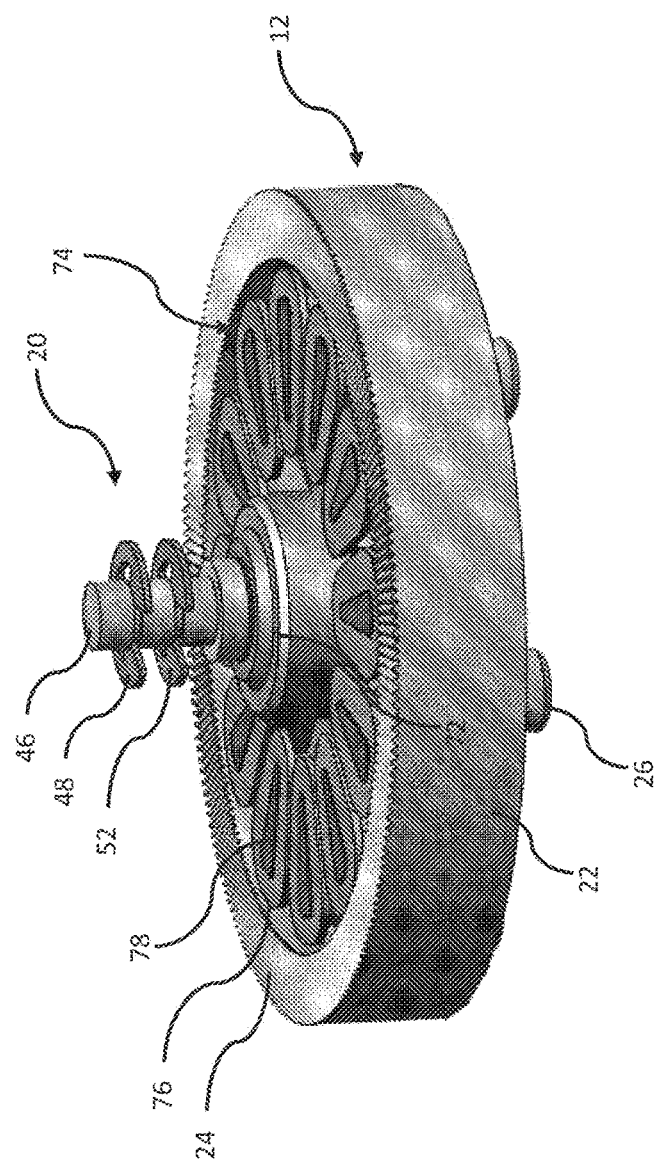
FIG. 9 is a perspective view of an output shaft and stator.
Figure 10:
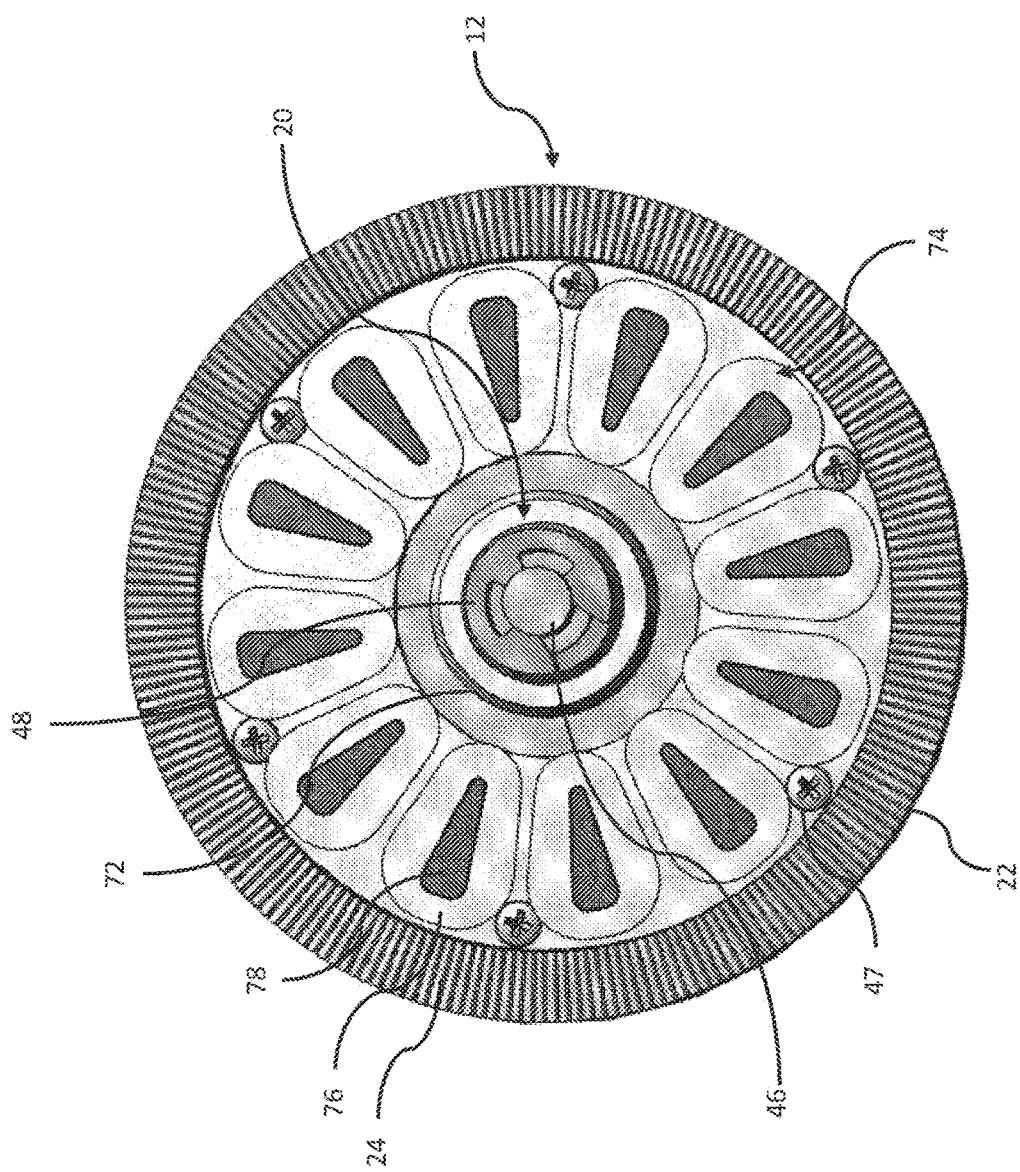
FIG. 10 is a top plan view of the output shaft and stator of FIG. 9.

Referring now to FIGS. 9 and 10, stator 12 is shown with output shaft assembly 20. With magnetic plate 64 of rotor 14 removed, a plurality of electromagnets 74 are shown disposed within stator 12. Each electromagnet 74 includes a coil of wire (not shown) surrounding each housing 76 and a core 78. As is described herein, electromagnets 74 are activated in a controlled sequence to cause rotor 14 to compress toward stator 12, which is mechanically translated into rotation by engaging a differential number of meshing teeth 24 and 28, thereby causing rotation of output shaft 46. Screws 47 maintain mechanical communication between the stator-housing assemblies to stator 12. The embodiment of stator 12 depicted in the figures includes 216 teeth 24, and rotor 14 includes 215 teeth 38.

Figure 11:
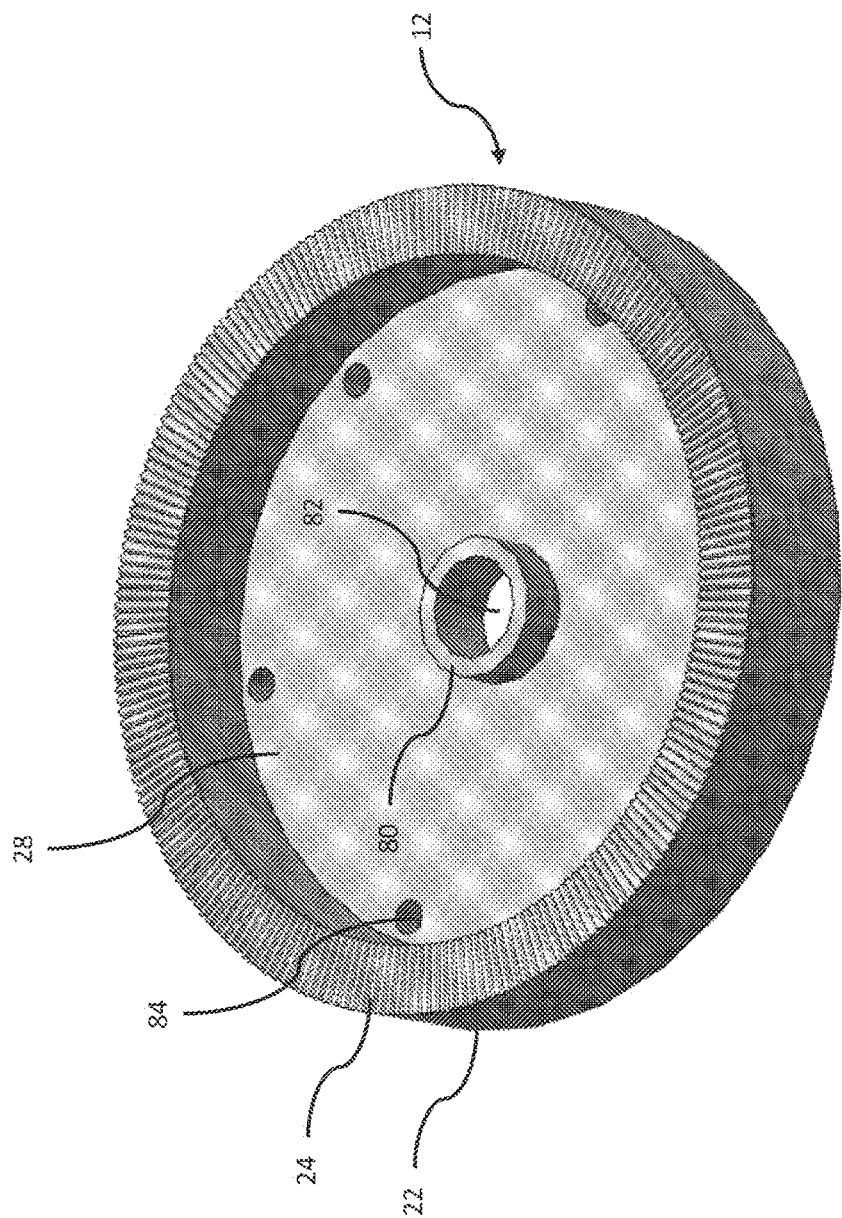
FIG. 11 is a perspective view of a component of the stator of FIG. 9.

FIG. 11 depicts cylindrical body 22 of stator 12 with electromagnets 74 removed. As shown, body 22 includes a central boss 80 that forms a central opening 82 through a lower wall 28 of body 22. Lower wall 28 also includes a plurality of peripheral openings 84.

Figure 12:
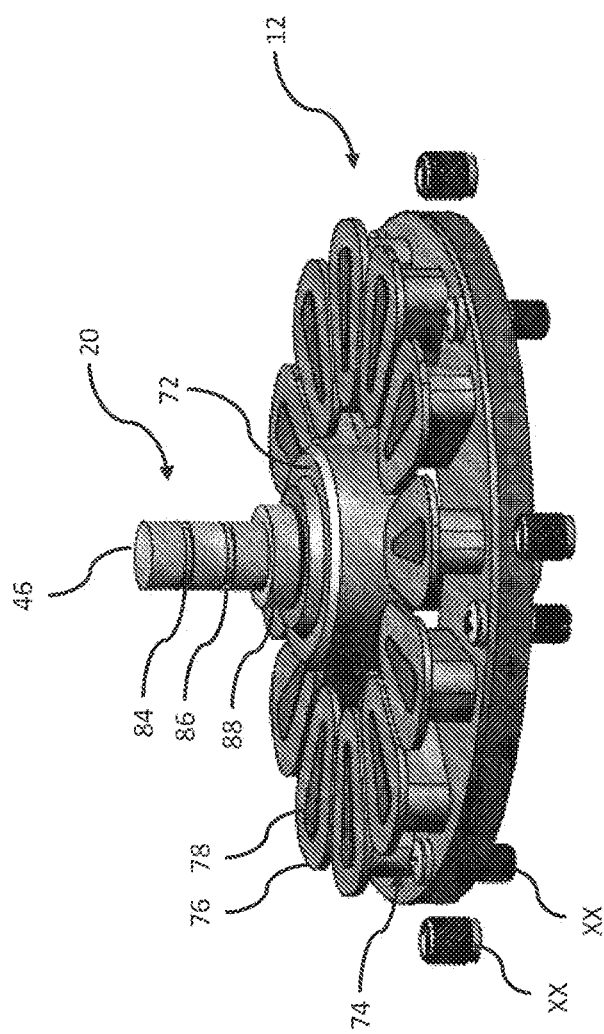
FIG. 12 is a perspective view of the output shaft and stator of FIG. 9 with the stator component of FIG. 11 removed.
Figure 13:
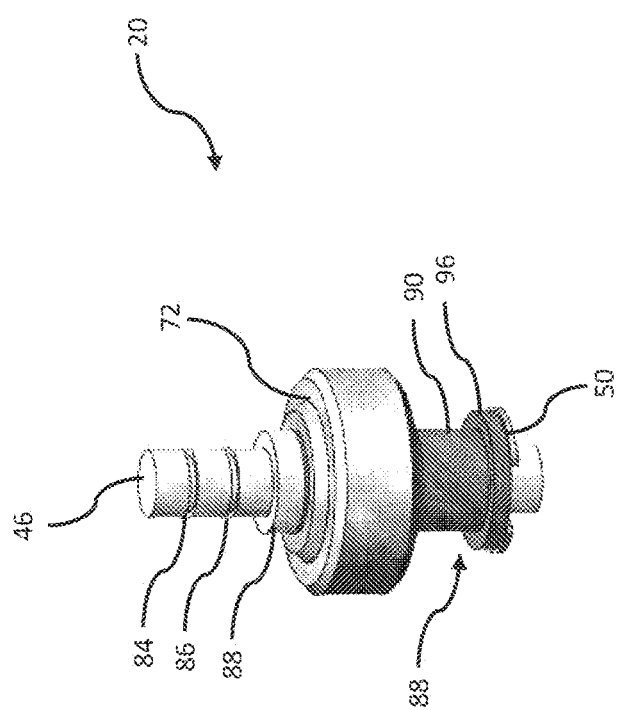
FIG. 13 is a perspective view of components of the output shaft of FIG. 9.
Figure 14:
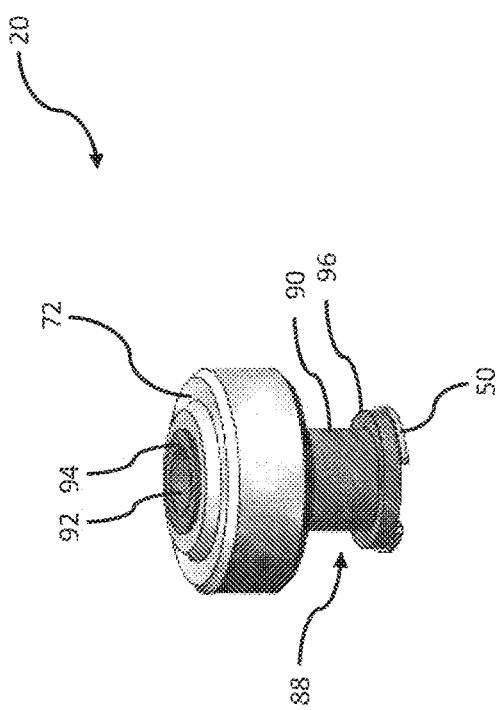
FIG. 14 is a perspective view of a spherical bearing of the motor of FIG. 1.
Figure 15:
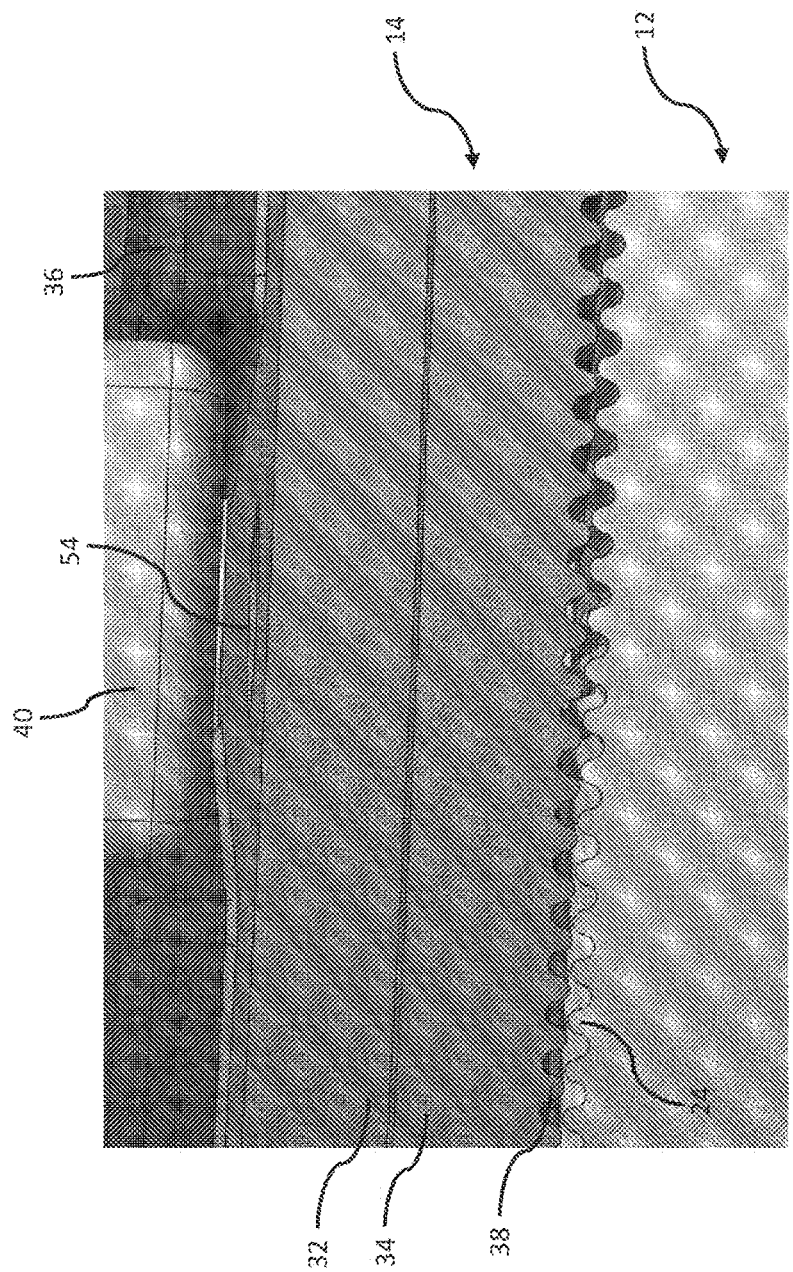
FIG. 15 is a perspective view of gear teeth of the stator and rotor of FIG. 1.

Referring now to FIGS. 12-14, output shaft assembly 20 is shown in further detail. Specifically, output shaft 46 is shown having two upper circumferential grooves 84, 86 for receiving retaining rings 48, 52, respectively. Shaft 46 also includes a collar 88 that engages spherical bearing 72. Shaft 46 also includes a lower circumferential groove (not shown) that receives retaining ring 50. As best shown in FIGS. 13 and 14, shaft 46 extends through a sleeve 88 that extends through spherical bearing 72. Sleeve 88 includes a central body 90 defining a central opening 92, an upper shoulder 94 and a lower shoulder 96.

A high torque motor 10 according to the present disclosure comprises a stator 12, which may be planar or conical, and a rotor 14 that may be planar, conical, or bowl shaped wherein the angle difference between the rotor 12 and stator 14 is between 0-45 degrees, more preferably 0-15 degrees, more preferably 0-5 degrees, and even more preferably 0-3 degrees. It should be understood that stator 12 may be on the outside or on the inside of the conical orientation, and that the conical orientation may be concave or convex with respect to the traction plane.

During operation, electromagnets 74 in stator 12 attract rotor 14 to pivot about spherical bearing 72 toward stator 12 resulting in stator-rotor compression substantially parallel to the axis of rotation. Stator teeth 24 and rotor teeth 38 then translate the compression force into tangential thrust causing rotor 14 to turn about the axis of rotation resulting in great leverage over a short distance of travel, as the compression wave sequentially activates from one pole set of electromagnets 74 to the next.

Spherical bearing 72 of the present disclosure provides low friction, multi-dimensional communication between stator 12 and rotor 14 about a fixed pivot point. Spherical bearing 72 may be a simple spherical journal bearing, a solid lubricant spherical bearing, a ball-joint bearing, or a spherical rolling joint bearing. Spherical roller bearings and spherical ball bearings may also be used if the inner race is modified to spherical shape rather than comprising a two dimensional fixed track.

Spherical bearing 72 of the present disclosure may also comprise a torque coupling such that torque may be extracted directly from the spherical bearing rather than the face of rotor 14. A spherical bearing with a hollow center may further reduce weight and allow for wires to pass through, or to make room for a torque transfer shaft between two rotors in a multi-rotor motor as described herein.

Output plate 18 may be coupled to rotor 14 using conventional shaft coupling techniques to transfer torque while tolerating continuous shaft misalignment, such as spider couplings, shoulder-rod couplings as in multi-piston hydraulic pumps, CV joints, spherical gear couplings, or friction couplings such as planar flexible o-rings. Some shaft couplings may provide higher torque output while others may dampen vibrations more efficiently.

Figure 16:
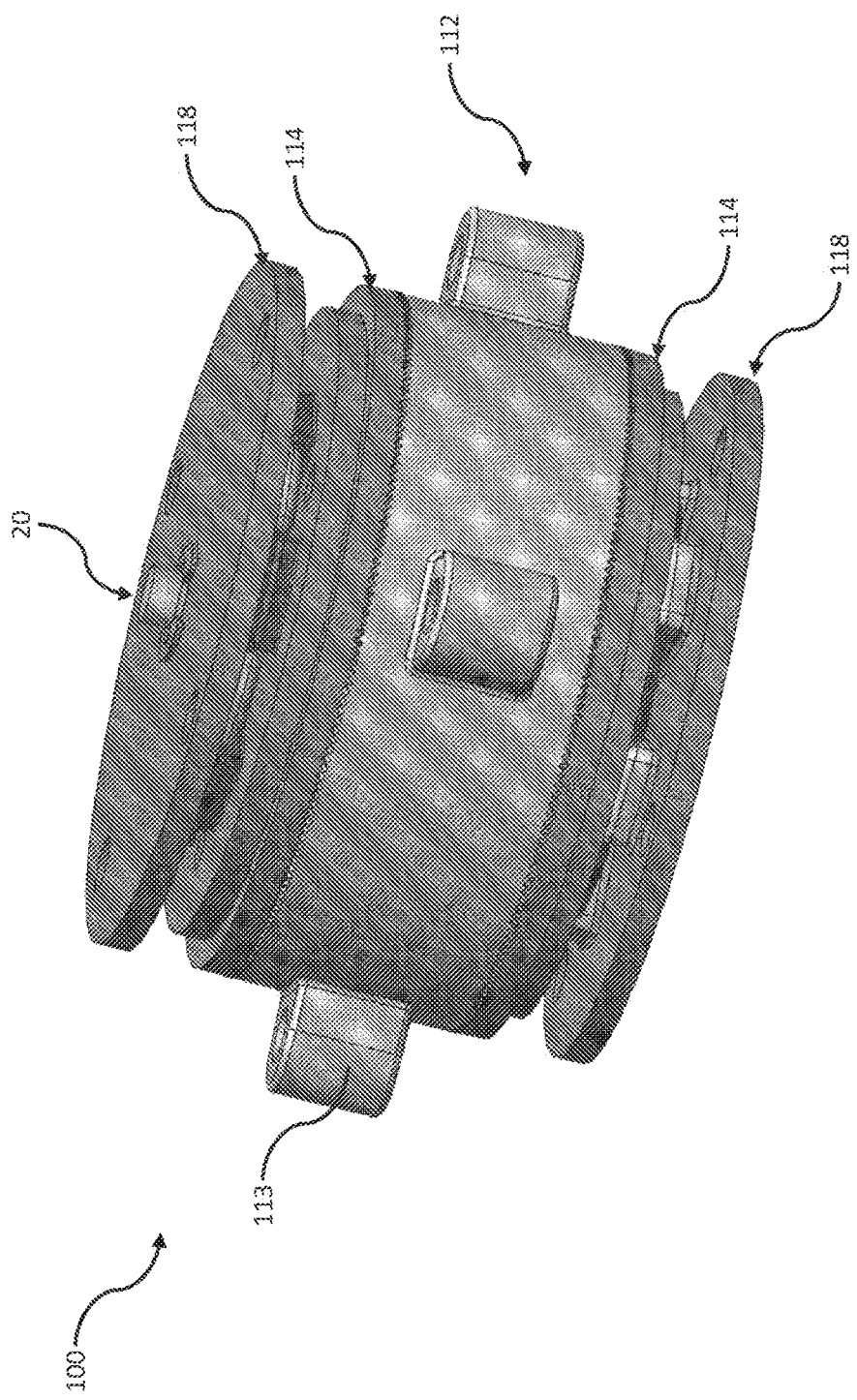
FIG. 16 is a perspective view of an alternative embodiment of a motor according to the present disclosure.
Figure 17:
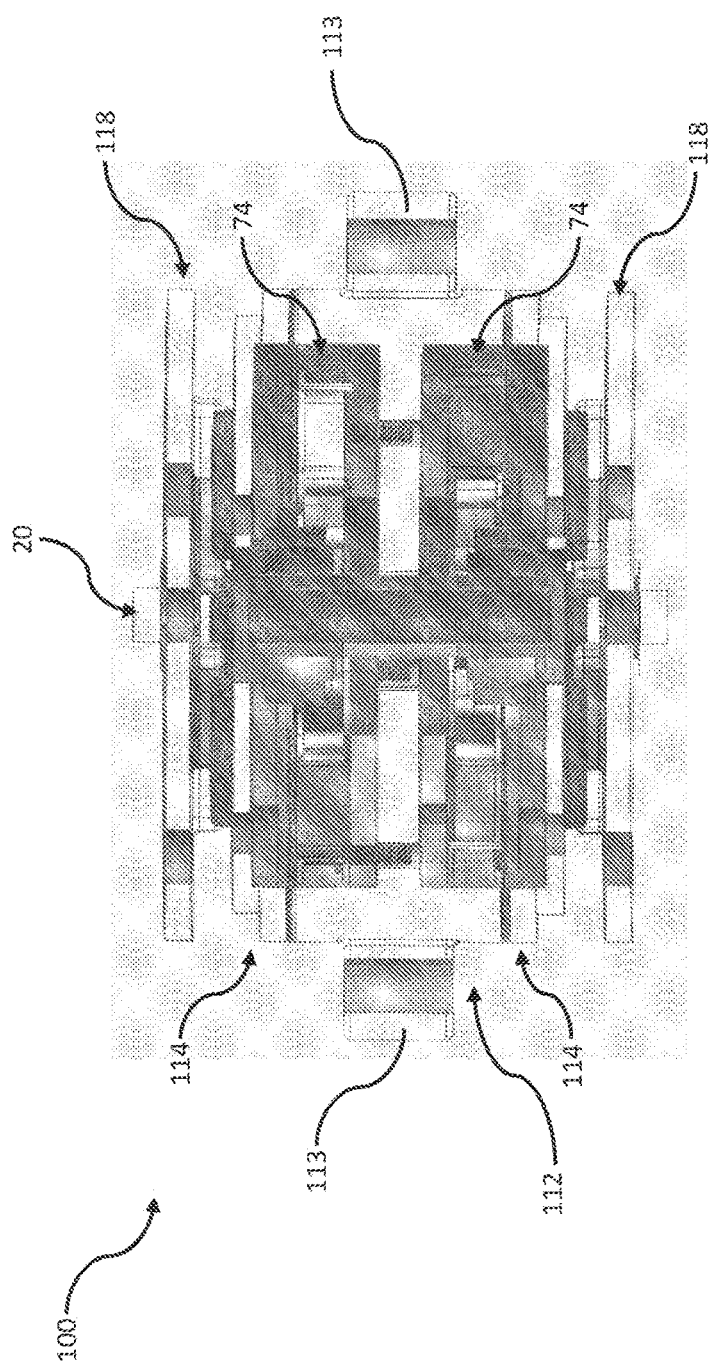
FIG. 17 is a cross-sectional view of the motor of FIG. 16.

Referring now to FIGS. 16 and 17, an electric motor 100 is shown with two rotors 114 and two output plates 118 that may be operated independently, or synchronously to produce a balanced system. Torque may be extracted from one or both output plate 118. Bosses 113 on the perimeter of stator 112 provide a point of counter-leverage for harnessing the torque. The electromagnetic circuits in this embodiment are isolated from one another.

Figure 18:
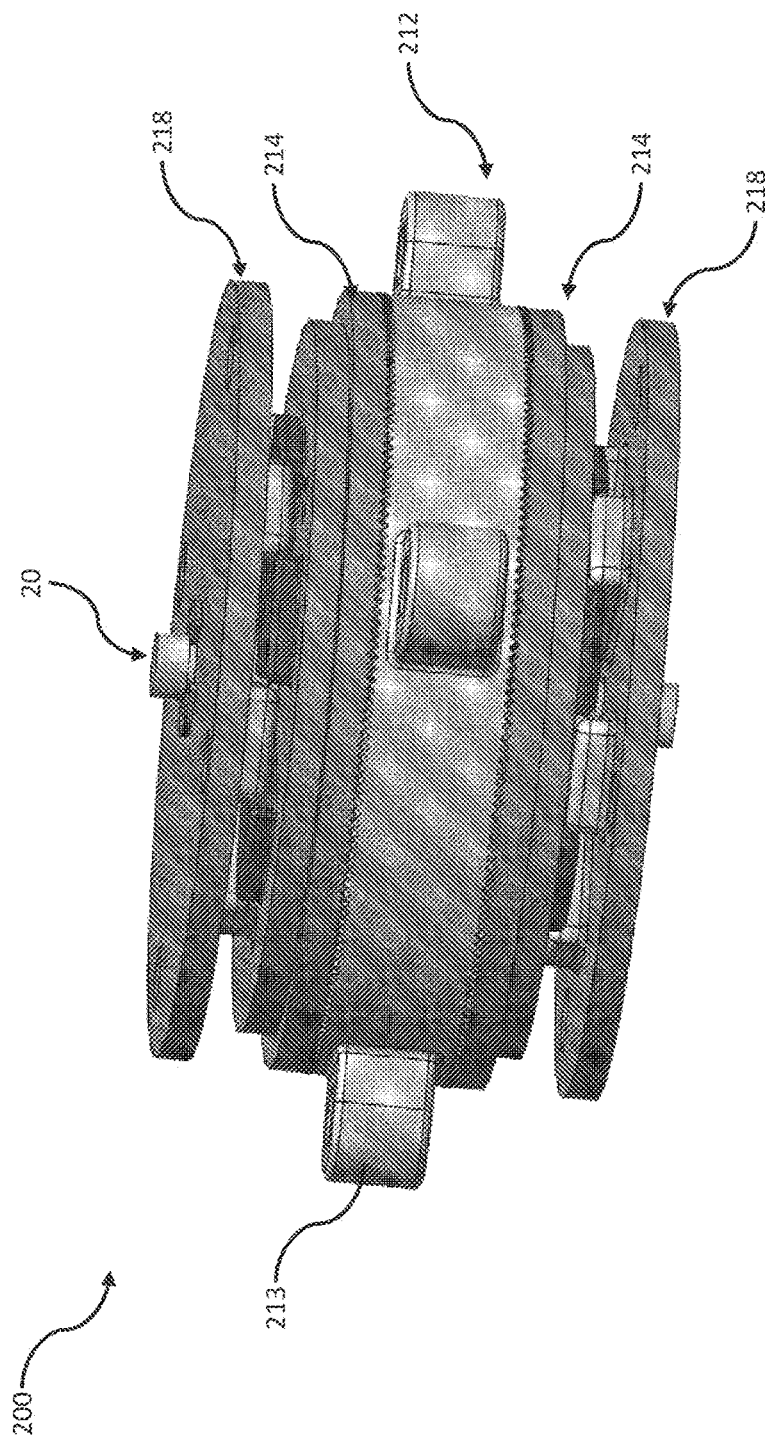
FIG. 18 is a perspective view of another embodiment of a motor according to the present disclosure.
Figure 19:
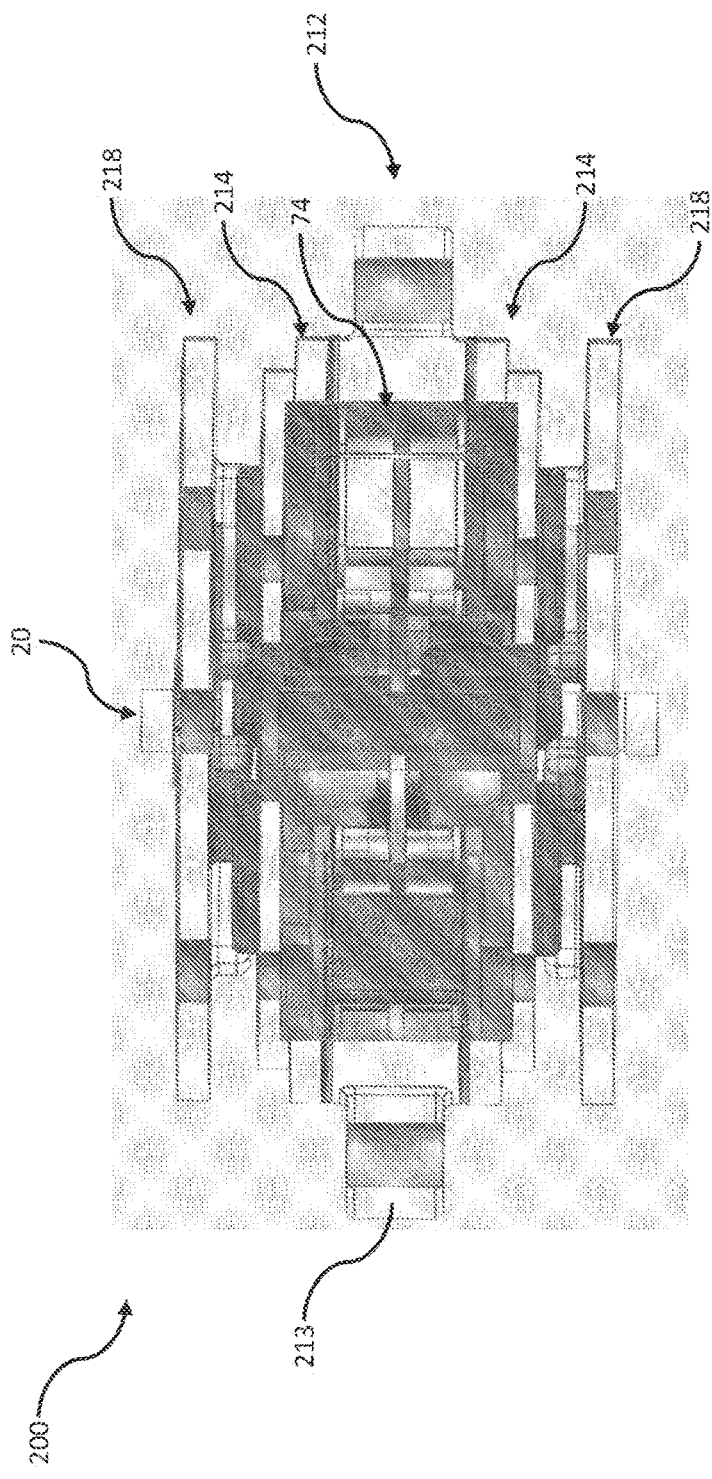
FIG. 19 is a cross-sectional view of the motor of FIG. 18.

FIGS. 18 and 19 depict another embodiment of an electric motor 200 wherein the stator core material operates in a closed loop between rotors 214, thereby saving space, enabling more compact design, and forcing synchronous operation between rotors 214 for optimal balancing. This embodiment may also enable pre-wound single pole subassemblies to be inserted into stator 212.

Figure 20:
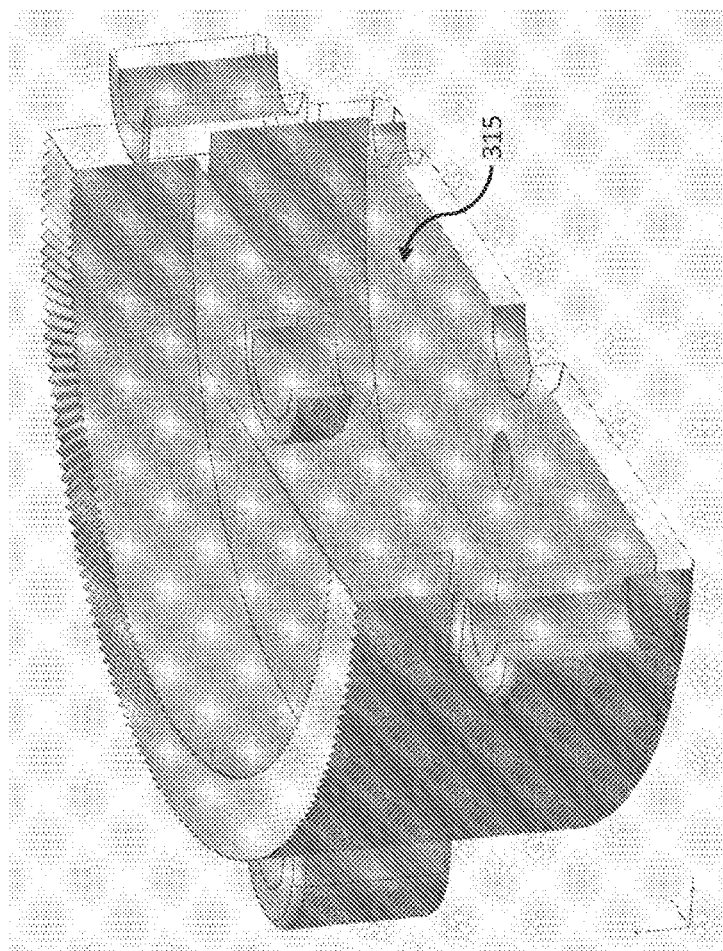
FIG. 20 is a cross-sectional view of an alternative embodiment of a stator for use with the various motor embodiments of the present disclosure.

Referring now to FIG. 20, an alternative embodiment of a stator 312 is shown. Stator 312 is similar to stator 212, but also includes a cooling chamber 315 to enable indirect fluid cooling from the coils through the back iron, and into stator 312 for removal by the cooling fluid. Stator 312 may be used in a single or dual rotor design.

When using an integral cooling chamber, the cooling flood continues from the cooling chamber 315 up to the coils to create direct fluid cooling of the electromagnetic coils. The fluid is isolated from the rotor via a fluid seal at the top of the stator poles to limit cavitation during operation. Another embodiment may harness rotor motion to drive fluid circulation throughout the motor and to a motor housing.

Figure 21:
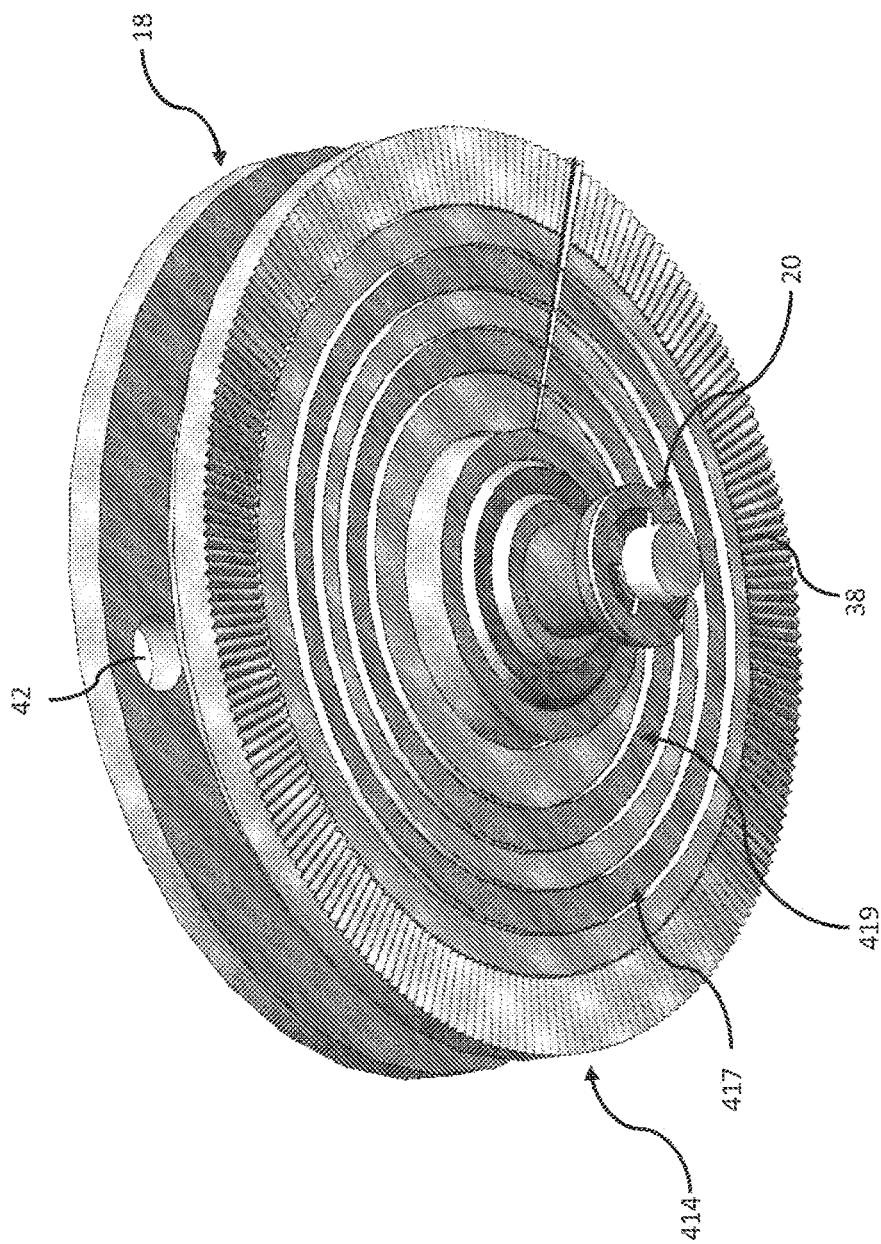
FIG. 21 is a perspective view of an alternative embodiment rotor for use with the various motor embodiments of the present disclosure.
Figure 22:
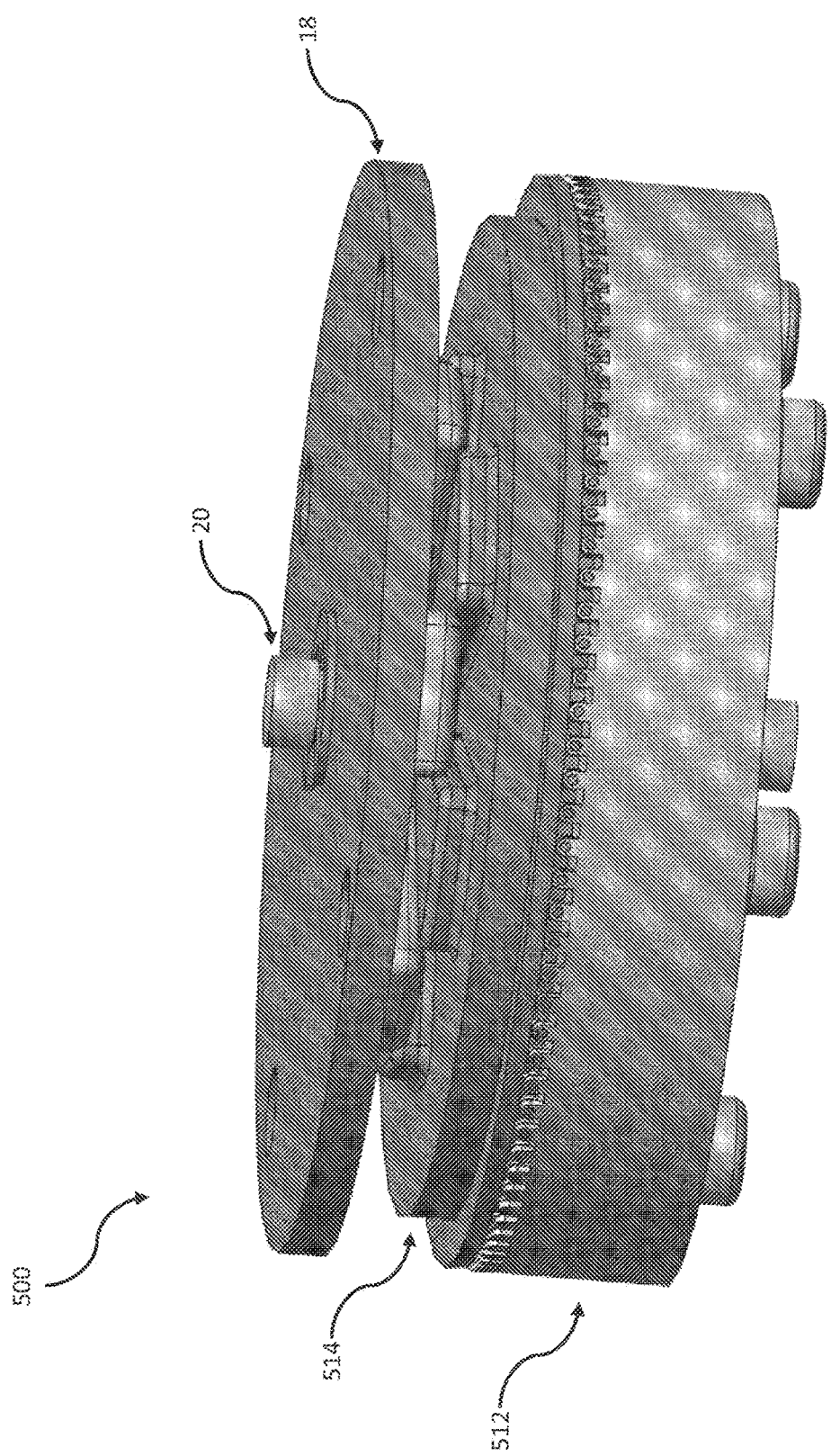
FIG. 22 is a perspective view of another alternative embodiment of a motor according to the present disclosure.
Figure 23:
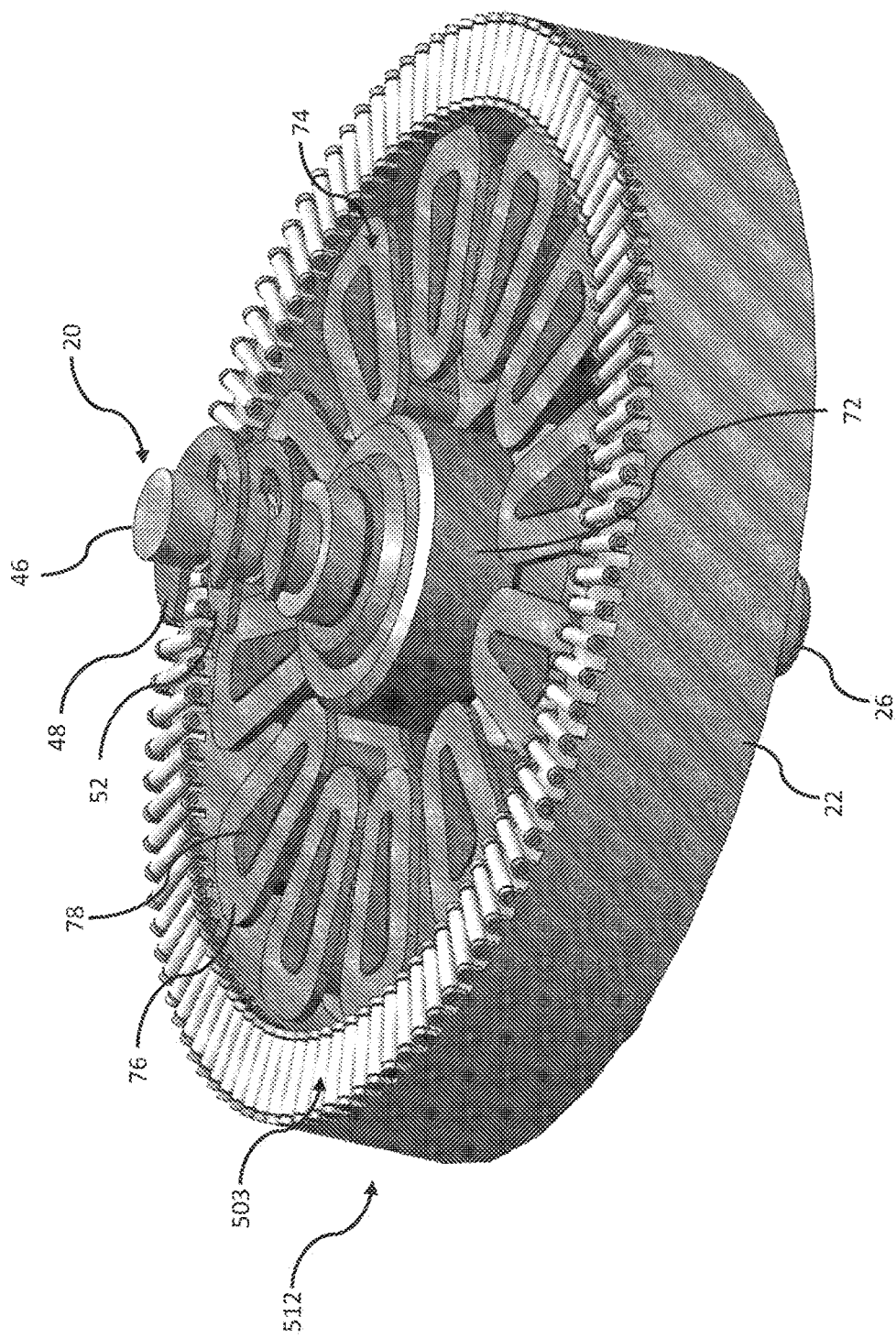
FIG. 23 is a perspective view of the stator of the motor of FIG. 22.
Figure 24:
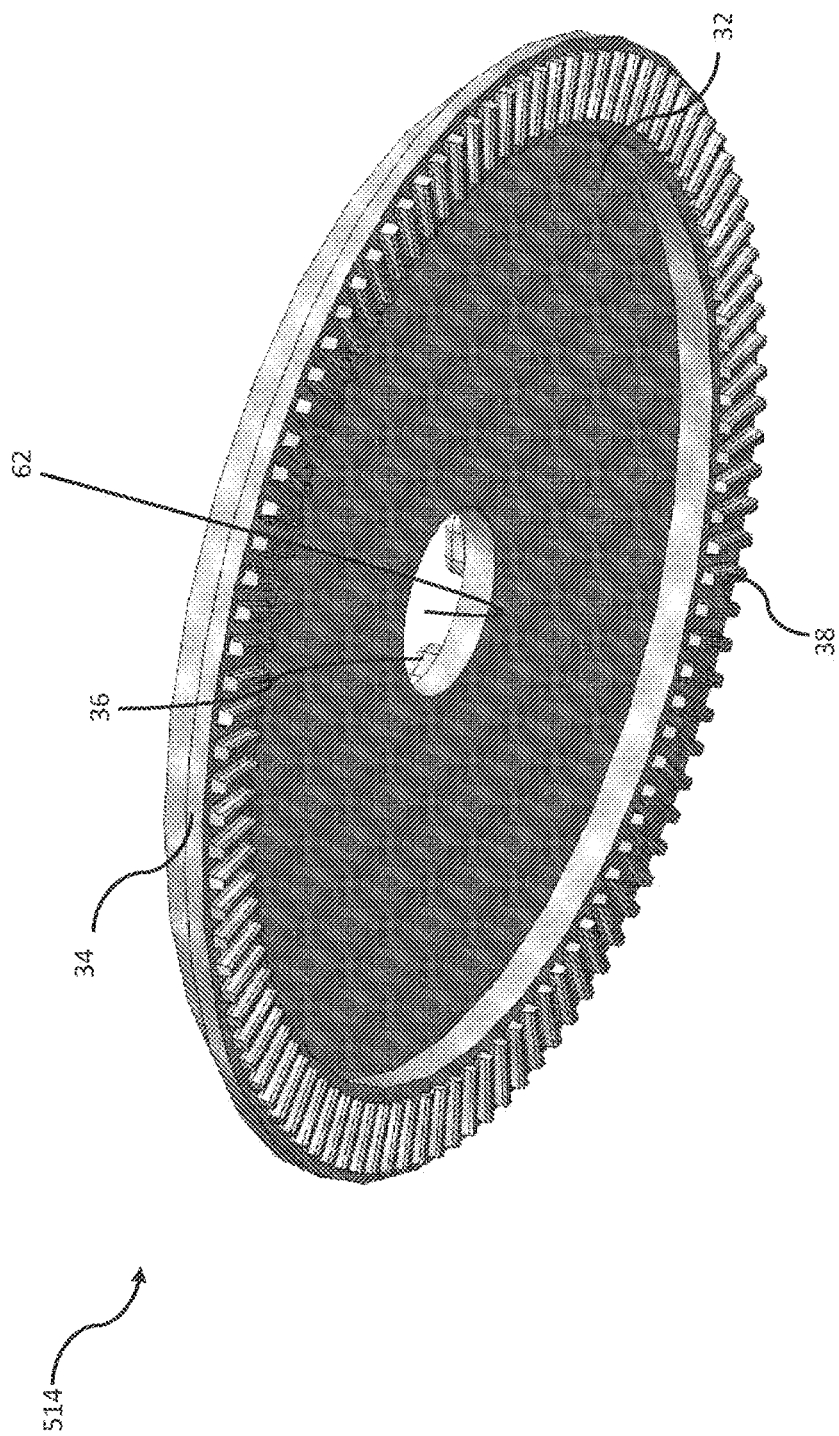
FIG. 24 is a perspective view of the rotor of the motor of FIG. 22.

In FIG. 21, an embodiment of a rotor 414 is shown having a permanent magnet system (shown as outer permanent magnetic ring 417 and inner permanent magnet ring 419). Rings 417, 419 are placed in rotor 414 such that they provide a continuous operational surface. Stator poles may then be activated to attract from one side while repelling from the other side to further increase torque density. Permanent magnet rings 417, 419 may also serve as magnetic preloads by attracting the pole or a secondary continuous magnetic rail on the stator. In addition, remanence in the electromagnetic core material after excitation may also serve as a permanent magnet for preloading applications.

Figure 25:
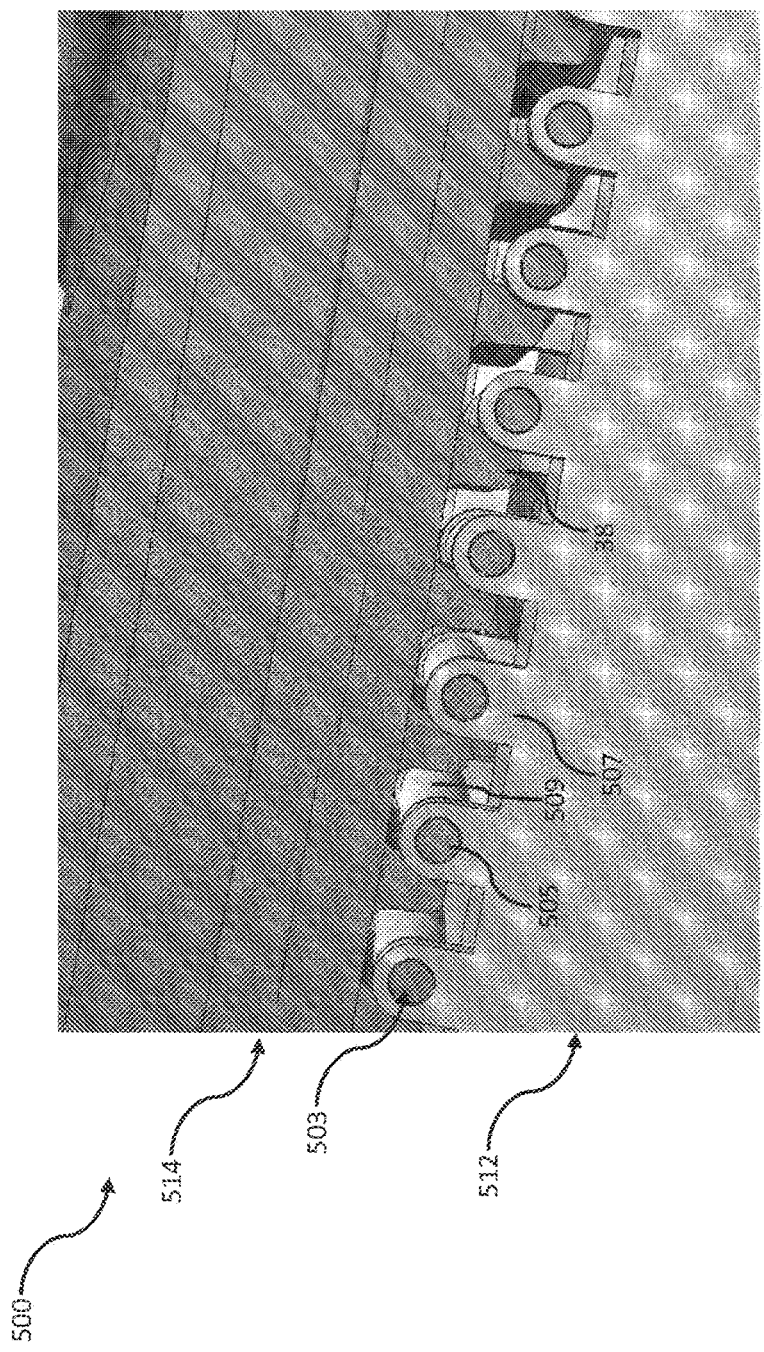
FIG. 25 is a perspective view of portions of the motor of FIG. 22.
Figure 26:
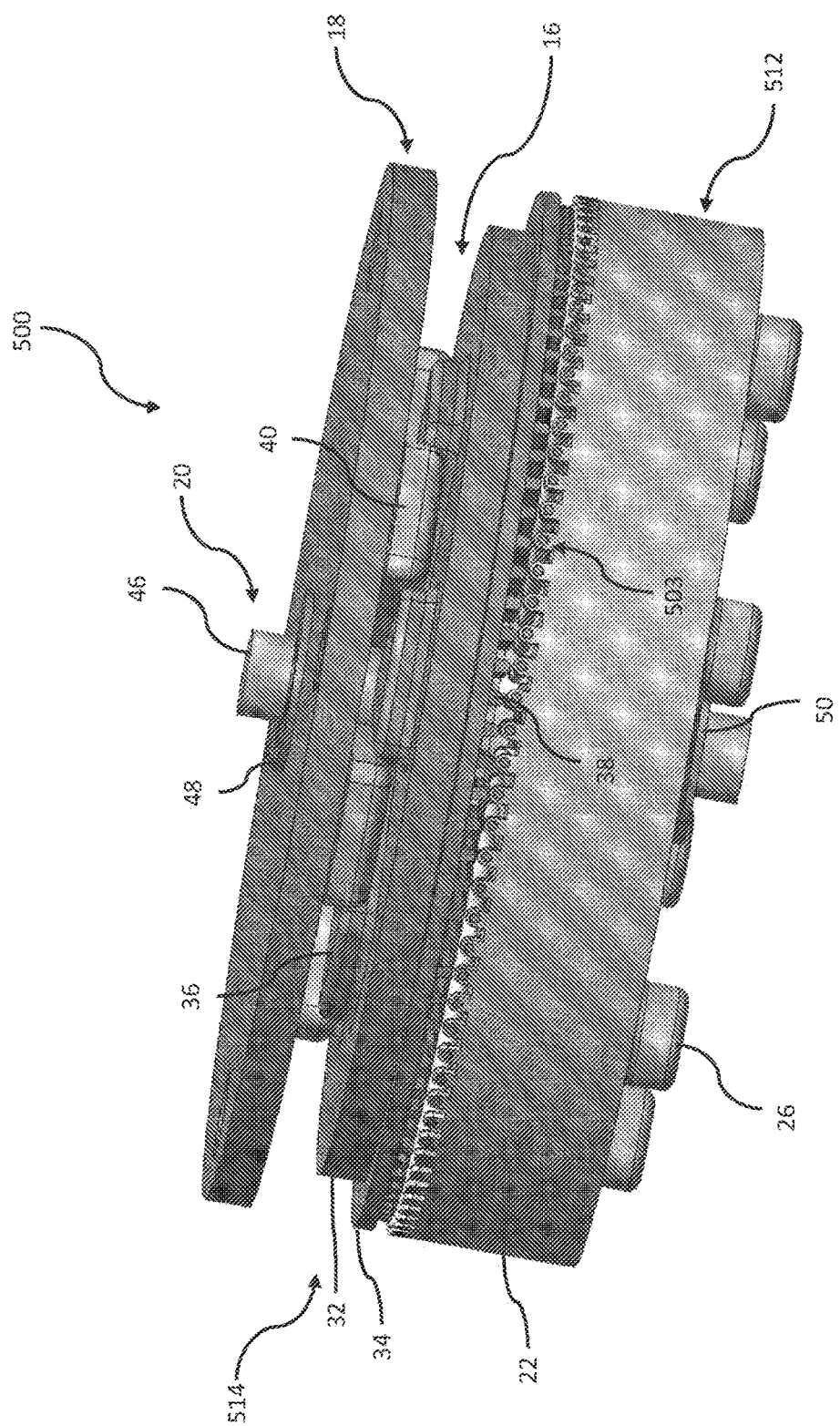
FIG. 26 is a perspective view of the motor of FIG. 22 in a neutral position.

Referring now to FIGS. 22-26, a motor 500 is shown using rolling elements 503 in stator 512 to translate the compression load into thrust efficiently through a shallow contact angle. Rolling elements 503 replace gear teeth 24 in previous embodiments. This embodiment would increase efficiency at the expense of mechanical complexity for long service life or continuous duty applications. Rolling elements 503 are shown tapered to maintain a constant rolling rate from the inner diameter to the outer diameter of the outer wall of stator 512. As best shown in FIG. 25, in one embodiment each rolling element 503 includes an axle 505 supported by and extending between a pair of spaced apart support tabs 507. A substantially cylindrical roller 509 is disposed on axle 505 such that roller 509 may freely rotate on axle 505 when engaged by teeth 38 of rotor 514. A neutral position of motor 500 is shown in FIG. 26 with the rolling elements 503 disengaged from the teeth of rotor 514. As indicated above, rolling elements 503 may generally be bushing supported rollers or rolling element supported rollers.

As used herein, the modifier "about" used in connection with a quantity is inclusive of the stated value and has the meaning dictated by the context (for example, it includes at least the degree of error associated with the measurement of the particular quantity). When used in the context of a range, the modifier "about" should also be considered as disclosing the range defined by the absolute values of the two endpoints. For example, the range "from about 2 to about 4" also discloses the range "from 2 to 4."

The connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements. The scope is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B or C may be present in a single embodiment; for example, A and B, A and C, B and C, or A and B and C.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art with the benefit of the present disclosure to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus Various modifications and additions can be made to the exemplary embodiments discussed without departing from the scope of the present disclosure. For example, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations as fall within the scope of the claims, together with all equivalents thereof.

I claim:

1. A motor, comprising:
   a stator having a plurality of electromagnets and a first plurality of stator traction components arranged around the electromagnets;
   a first rotor having a first plurality of rotor traction components arranged to engage the first plurality of stator traction components;
   at least one of the stator or the first rotor further comprising a spherical bearing operationally connecting the stator and the first rotor; and
   a control circuit;
   wherein the first plurality of stator traction components are arranged in a planar or conical relationship and the first plurality of rotor traction components are arranged in a corresponding planar or conical relationship and disposed to form a gap between the first plurality of stator traction components and the first plurality of rotor traction components;
   wherein the control circuit is configured to activate the plurality of electromagnets to cause the first rotor to pivot about a pivot point defined in the spherical bearing and change the gap such that the first rotor compresses against the stator and the first plurality of stator traction components and the first plurality of rotor traction components translate the compression into tangential thrust and rotation of the first rotor; and
   wherein the first plurality of stator traction components includes a first number of rolling elements.

2. The motor of claim 1, wherein the first plurality of rotor traction components includes a first number of teeth, the first number of teeth being different from the first number of rolling elements.

3. The motor of claim 1, wherein each of the rolling elements includes an axle supported by and extending between a pair of spaced apart support tabs extending from a first side of the stator, and a substantially cylindrical roller mounted for rotation on the axle in response to engagement by the first plurality of rotor traction components.

4. The motor of claim 1, further comprising an output plate having a plurality of drive teeth, wherein the first rotor further includes a plurality of drive teeth configured to mesh with the plurality of drive teeth of the output plate as the first rotor rotates, thereby causing the output plate to rotate.

5. The motor of claim 1, wherein the first plurality of stator traction components are formed on a conical surface of the stator and the first plurality of rotor traction components are formed on a conical surface of the first rotor configured to substantially correspond to the conical surface of the stator.

6. The motor of claim 5, wherein an angle difference between the conical surface of the stator and the conical surface of the first rotor is between zero degrees and three degrees.

7. The motor of claim 1, wherein the spherical bearing is selected from the group consisting of a simple spherical journal bearing, a solid lubricant spherical bearing, a ball-joint bearing, or a spherical rolling joint bearing.

8. The motor of claim 1, wherein the stator further comprises a second plurality of stator traction components, the first plurality of stator traction components being arranged on a first surface of the stator and the second plurality of stator traction components being arranged on a second surface of the stator that is substantially opposite the first surface.

9. The motor of claim 8, further comprising a second rotor having a second plurality of rotor traction components arranged to engage the second plurality of stator traction components, wherein the control circuit is configured to activate the plurality of electromagnets to cause the first rotor to compress against the first plurality of stator traction components and to cause the second rotor to compress against the second plurality of stator traction components.

10. The motor of claim 1, wherein the stator includes a cooling chamber configured to enable indirect fluid cooling of the plurality of electromagnets.

11. The motor of claim 1, wherein the first rotor includes a magnetic component having at least two concentric permanent magnetic rings.

12. A motor, comprising:
    a stator;
    a first rotor disposed adjacent the stator;
    a first plurality of rolling elements arranged on one of the stator or the first roller;
    a first plurality of teeth arranged on another of the stator or the first roller to engage the first plurality of rolling elements;
    a plurality of electromagnets mounted to one of the stator or the first rotor;
    a magnetic component mounted to another of the stator or the first rotor;

at least one of the stator or the first rotor further comprising a spherical bearing operationally connecting the stator and the first rotor; and a control circuit configured to activate the plurality of electromagnets to cause the first rotor to pivot about a pivot point defined in the spherical bearing and change a gap between the first plurality of rolling elements and the first plurality of teeth such that the first rotor compresses against the stator and the first plurality of rolling elements and the first plurality of teeth translate the compression into tangential thrust and rotation of the first rotor.

13. The motor of claim 12, wherein the first plurality of rolling elements are arranged in a planar or conical relationship and the first plurality of teeth are arranged in a corresponding planar or conical relationship and disposed to form the gap between the first plurality of rolling elements and the first plurality of teeth.

14. The motor of claim 12, wherein the first plurality of teeth includes a first number of teeth and the first plurality of rolling elements includes a first number of rolling elements, the first number of teeth being different from the first number of rolling elements.

15. The motor of claim 12, wherein each of the rolling elements includes an axle supported by and extending between a pair of spaced apart support tabs extending from a first side of the stator, and a substantially cylindrical roller mounted for rotation on the axle in response to engagement by the first plurality of teeth.

16. The motor of claim 12, further comprising an output plate having a plurality of drive teeth, wherein the first rotor further includes a plurality of drive teeth configured to mesh with the plurality of drive teeth of the output plate as the first rotor rotates, thereby causing the output plate to rotate.

17. The motor of claim 12, wherein the first plurality of rolling elements are formed on a conical surface of the stator and the first plurality of teeth are formed on a conical surface of the first rotor configured to substantially correspond to the conical surface of the stator.

18. The motor of claim 12, wherein the first plurality of rolling elements are arranged on a first surface of the stator and a second plurality of rolling elements is arranged on a second surface of the stator that is substantially opposite the first surface.

19. The motor of claim 18, further comprising a second rotor having a magnetic component and a second plurality of teeth arranged to engage the second plurality of rolling elements, wherein the control circuit is configured to activate the plurality of electromagnets to cause the first rotor to compress against the first plurality of rolling elements and to cause the second rotor to compress against the second plurality of rolling elements.

20. A method of operating a motor, comprising:

activating a plurality of electromagnets mounted to a stator in a sequence;

wherein activating the plurality of electromagnets causes a change in a gap between a plurality of teeth arranged on a rotor adjacent the stator and a plurality of rolling elements arranged on the stator, thereby causing the rotor to compress against the stator and the plurality of rolling elements and the plurality of teeth to translate the compression into rotation of the rotor.

* * * * *